(12) United States Patent
Gottschalk et al.

(10) Patent No.: US 8,778,049 B2
(45) Date of Patent: Jul. 15, 2014

(54) ANTI-SCALE COMPOSITION AND METHOD OF USE FOR LEACH FIELDS

(75) Inventors: Kevin Gottschalk, Maidens, VA (US); John Richardson, Hanover, VA (US); Greg Rose, Richmond, VA (US); Rob Bedinger, Richmond, VA (US)

(73) Assignee: Chemtreat, Inc., Glen Allen, VA (US)

( * ) Notice: Subject to any disclaimer, the term of this patent is extended or adjusted under 35 U.S.C. 154(b) by 0 days.

(21) Appl. No.: 13/218,441

(22) Filed: Aug. 25, 2011

(65) Prior Publication Data

US 2012/0111152 A1 May 10, 2012

Related U.S. Application Data

(60) Provisional application No. 61/377,078, filed on Aug. 25, 2010.

(51) Int. Cl.
*C22B 3/04* (2006.01)
(52) U.S. Cl.
USPC ............................................................ 75/743
(58) Field of Classification Search
USPC ............................................................ 75/743
See application file for complete search history.

(56) References Cited

U.S. PATENT DOCUMENTS

| | | | | | |
|---|---|---|---|---|---|
| 5,658,464 | A | * | 8/1997 | Hann et al. | 210/697 |
| 5,668,219 | A | * | 9/1997 | Polizzotti et al. | 525/294 |
| 6,406,675 | B1 | * | 6/2002 | Small | 423/29 |
| 7,841,411 | B2 | * | 11/2010 | Fuller et al. | 166/300 |
| 2006/0006256 | A1 | * | 1/2006 | Smith et al. | 239/666 |

\* cited by examiner

*Primary Examiner* — Roy King
*Assistant Examiner* — Xiaowei Su
(74) *Attorney, Agent, or Firm* — Oliff PLC

(57) ABSTRACT

Disclosed is a method for treating heap leach stacks by applying an insoluble polyimide composition, such as polysuccinimide, to the surface of an ore stack and/or incorporating the insoluble polyimide composition throughout the ore stack. The insoluble polyimide composition is then exposed to an aqueous solution to initiate hydrolysis and produce one or more water soluble products, such as hydrolyzed polyimides, polycarboxylates, polycarboxylic acids and mixtures thereof that will permeate the ore stack at a concentration sufficient to suppress scale formation within the leach stack. The water soluble products may also act to suppress scale formation in piping and channels peripheral to the leach stack, thereby reducing maintenance expenses.

17 Claims, 4 Drawing Sheets

ANTI-SCALE COMPOSITION AND METHOD OF USE FOR LEACH FIELDS

PRIORITY STATEMENT

This application claims priority from U.S. Provisional Patent Appl. No. 61/377,078, which was filed on Aug. 25, 2010, the entire contents of which are hereby incorporated by reference.

FIELD OF THE INVENTION

The field of the invention relates to a composition and method for treating heap leaching systems using particulate polyimide homopolymers and/or copolymers that form water soluble carboxylates under alkaline hydrolysis. The application of these disclosed compositions in leach fields can result in increased recovery of target metals from the heap while providing reduced scaling which, in turn, improves percolation and reduces drip line fouling. The application of these disclosed compositions can also improve dissolution of lime additives in the heap, thereby reducing the amount of lime required in the construction of a heap leach.

BACKGROUND OF THE INVENTION

One technique for extracting metal from ores and other mineral material is to heap leach the material. Lixiviation is the process for effecting contact between the ore and the leaching solution. The process is normally accomplished by circulating the solution through the stationary ore mass, a technique commonly known as "percolation." The rate of percolation will depend on a number of factors including, for example, the particle size distribution of the ore, the depth of the leach pad, the composition of the heap, scale formation within the heap, the strength of the leaching solution (e.g., conventional leach heaps use one to four pounds of sodium cyanide per ton of water for recovering gold), the quantity of leaching solution per unit area or mass and the manner in which the leaching solution is distributed over the bed of crushed ore.

An engineered pile, or heap, of particulate material is typically constructed over an engineered liner and liquid collection system. Leach solution is then applied to the upper surface of the heap and allowed to percolate through the heap where it contacts the material and dissolves one or more metal of interest or a compound thereof into the leach solution to form a pregnant solution. The pregnant leach solution is then recovered through a solution collection system and processed to separate the dissolved metal(s).

A common problem with heap leaching is the non-uniform leaching of metals from the heap. Even after extensive leaching, some portions of the heap often remain under-leached or even substantially un-leached. For example, it is often difficult to ensure that the applied leach solution will contact all portions of the heap uniformly because of permeability variations that exist within the heap. Such permeability variations may result in preferential flow of leach solution through higher permeability portions of the heap, leaving lower permeability portions under-leached or un-leached. Differences in the physical and/or chemical properties in the ore found in some portions of the heap may be less conductive to dissolution of the metal into the leach solution and may also result in less uniform leaching.

Metals remaining in under-leached and un-leached portions of a heap following heap leach operations often represent a significant loss. Some heaps are difficult to percolate because their high clay content results in leachate pooling on the surface of the heap and/or presents a barrier between to the target particle and the leachate. For these reasons, higher clay ores may be deemed uneconomical to leach or may require alternate milling extraction technologies which are energy intensive and may be substantially more expensive per unit of metal recovered.

Some ores include calcium and iron deposits distributed through the heap that incorporate valuable metal content but which are more resistant to conventional leach solutions than other ore components and tend, therefore, to suppress metal recovery percentages. Improved dissolution of these calcium and iron ore phases can result in increased liberation of metal.

Leach solutions are typically applied to heaps through a series of emitter lines which drip leach solution on an upper surface of the heap. Because these emitter lines are subject to scale formation, polymers such as polyacrylate and phosphonates are typically added to the leach solution to suppress scale formation in the emitter lines as well as within the heap itself and the solution collection system. A leaching solution, or lixiviant, used for reclaiming gold and/or silver from a bed of low-grade ore generally constitutes aqueous solutions of sodium cyanide mixed with oxygen (air) to convert the noble metal (M) to a soluble compound NaM(CN), from which M can subsequently be recovered either by precipitation with zinc dust or aluminum powder, carbon absorption, or by electrowinning. Electrowinning, also called electroextraction, is the electrodeposition of metals from their ores that have been put in solution or liquefied to form a leach solution. A current is then passed from an inert anode through the leach solution so that the metal is deposited (electroplated) onto a cathode and thereby removed from the solution with the resulting metals being referred to as electrowon. Sulfuric acid or sulfuric acid-ferric sulfate is the principle practical copper mineral lixiviant.

After the metal ore has been pre-crushed to sufficiently small size, thereby increasing its surface area and enabling the leaching solution to reach more of the metallic-mineral particles within the ore, the crushed ore is typically heaped onto an impervious pad to a depth of ten to thirty feet (3 to 10 meters). Gold and silver ores, for example, are run-of-mine or more commonly crushed to 40-200 mesh size with the metal recovery increasing as the ore particle size is reduced. Metal ore particles that are too fine, however, have a tendency to pack together and suppress percolation through the crushed ore. The underlying pad is usually sloped with the pregnant solution being recovered for subsequent processing by perforated drain pipes or channels positioned on the impervious base, typically at the lower "toe" portion of the pad.

DESCRIPTION OF RELATED ART

U.S. Pat. No. 7,841,411 to Fuller, et al. is directed to methods of treating subterranean formations penetrated by a wellbore including the steps of forming a treatment fluid comprising an aqueous carrier fluid and a solid-form polyimide homopolymer or copolymer capable of hydrolyzing to form polycarboxylates and/or polycarboxylic acids and introducing the fluid into the formation through the wellbore. Also disclosed are alternative treatment fluids comprising an aqueous carrier fluid, a solid-form polysuccinimide homopolymer or copolymer and at least one of a viscosifying agent, proppant and an acid capable of dissolving materials found in the subterranean formation. Sandstone-containing formations may be treated with, for example, a treatment fluid comprising an aqueous solution containing a hydrogen fluoride source, ammonium hydroxide and a polyimide and/or a polycarboxylate.

U.S. Pat. No. 7,074,881 to Swift, et al. discloses methods for synthesizing copoly(succinimide-aspartate), copolymers and derivatives thereof, prepared in a thermal or supercritical fluid process. Also disclosed are methods of isolating, compounding, stabilizing and processing the copoly(succinimide-aspartate) and its derivatives.

U.S. Pat. No. 5,610,267 to Wood, et al. discloses processes for preparing polysuccinimide by high temperature reaction in which polyaspartate, a compound useful for inhibiting incrustations resulting from hard water and useful in detergent formulations, by reacting malic acid, maleic acid or fumaric acid with ammonia, in a molar ratio of 1:1-2.1 at temperatures greater than 140° C., followed by conversion of the polysuccinimide to a salt of polyaspartic acid by basic hydrolysis.

U.S. Pat. No. 5,531,934 to Freeman, et al. discloses methods for inhibiting corrosion of ferrous metals in aqueous systems adding an effective amount of at least one poly (amino acids) to the aqueous system. The corrosion inhibiting poly(amino acids) comprise the reaction products of at least one compound selected from amino acids, amic acids, ammonium salts of monoethylenically unsaturated dicarboxylic acids, ammonium salts of hydroxypolycarboxylic acids and combinations thereof. These corrosion inhibiting compositions comprising one or more homopolymers of amino acids and one or more pyrophosphates can be added to aqueous systems to inhibit corrosion.

U.S. Pat. No. 5,391,642 to Wood discloses higher molecular weight copolymers of polyaspartic acid which are suitable for inhibiting scale deposition that may be obtained by reacting maleic acid and ammonia in a stoichiometric excess, with a diamine or a triamine, at 120°-350° C., and then converting the resulting copolymer of polysuccinimlde to a salt of a copolymer of polyaspartic acid by hydrolyzing the copolymer with a hydroxide.

U.S. Pat. No. 5,260,272 to Donachy, et al. discloses polypeptides having the formula poly$(X)_m(Y)_n$ wherein X is selected from the group consisting of aspartate, glutamate, glutamine, asparagine, mixtures and block polymers thereof, Y is selected from the group consisting of phosphoserine, sulfoserine, phosphohomoserine, phosphotyrosine, phosphothreonine, phosphoglutamine, phosphoasparagine, serine, alanine, dehydroalanine and mixtures thereof, where m ranges from 5 to 199 and n ranges from 1 to 10 have been demonstrated to inhibit mineral deposition, and can be used for inhibiting mineral deposits. Serine-containing polypeptides can be thermally synthesized by combining the necessary amino acid residues in a reaction vessel, eliminating oxygen to preclude charring, and heating said reaction vessel in a heating medium to a temperature of about 155° C.

U.S. Pat. No. 5,152,902 to Koskan, et al. discloses β-polyaspartic acid having a weight average molecular weight of 1000 to 5000 produced by hydrolyzing anhydropolyaspartic acid, exhibits a high degree of calcium carbonate and calcium phosphate inhibition.

U.S. Pat. No. 5,116,513 to Koskan, et al. discloses the use of polyaspartic acid as a calcium sulfate and barium sulfate inhibitor. Although all forms of polyaspartic acid can be used in most applications, β-polyaspartic acids are generally preferred.

U.S. Pat. No. 4,534,881 to Sikes, et al. discloses methods for inhibiting formation of $CaCO_3$-containing deposits on a surface by applying a composition comprising an anti-calcification-effective amount of a poly amino acid, a poly amino acid amide or derivative thereof. The compositions and methods disclosed are useful for preventing and/or retarding inorganic scaling, as well as for inhibiting fouling by plant or animal organisms.

Additional relevant references include, for example, U.S. Pat. Nos. 4,551,261; 4,634,532; 4,722,832; 5,505,857; 5,753,597; 5,776,875; 6,495,658; 6,784,280; 7,559,974; 7,682,420; 7,704,298; 7,722,840 and U.S. Pub. Pat. Appl. Nos. 2009/0101587; 2009/0151944; 2010/0035799; 2010/0038290 and 2010/0119412. All the references cited in this disclosure are hereby incorporated by reference, in their entirety.

BRIEF SUMMARY

Disclosed are materials and methods for treating heap leach stacks by applying an insoluble polyimide composition, such as polysuccinimide, to the surface of an ore stack and/or incorporating the insoluble polyimide composition throughout the ore stack. The insoluble polyimide composition is then exposed to an aqueous solution to initiate hydrolysis and produce one or more water soluble products, such as hydrolyzed polyimides, polycarboxylates, polycarboxylic acids and mixtures thereof, that will permeate the ore stack at a concentration sufficient to suppress scale formation within the leach stack. The water soluble products may also act to suppress scale formation in piping and channels peripheral to the leach stack, thereby reducing maintenance expenses.

BRIEF DESCRIPTION OF THE DRAWING(S)

It should be noted that these Figures are intended to illustrate general characteristics of the methods and materials disclosed and to supplement the written description provided below. These drawings do not, however, precisely reflect the structural or logical arrangement of systems that could used to practice the disclosed methods or the performance characteristics of any given embodiment, and, accordingly, should not be interpreted as unduly defining or limiting the following claims.

DETAILED DESCRIPTION

The polyimide may be a homopolymer or copolymer with all or a portion of such homopolymer or copolymer selected from at least one of polysuccinimide, polymaleimide, poly(aspartic acid), polyaspartate, poly(amino acids), poly(ethylene glycol), poly(propylene glycol), and N-derivatized polyaspartamide, and wherein the copolymer includes block or random copolymers with portions of at least two of the monomer units of succinimide, maleimide, aspartate, aspartic acid, glutamic acid, asparagine, glutamine, lysine, arginine, alanine, valine, serine, threonine, and other amino acids and their salts thereof. The solid-form polyimide may be in the form of at least one of particles, fibers, beads, films, ribbons, rods, elongated bodies and platelets.

The polycarboxylic acid or polycarboxylates are water soluble and those derivatives bearing amide linkages in the backbone, including polyaspartate homopolymers and copolymers as well as other poly(amino acids), may further react to form monomeric acids under certain conditions, including exposure to high-pH or high-temperatures. An example of a polyimide that undergoes such reactions is polysuccinimide, which undergoes the reactions illustrated in Equation [1] below:

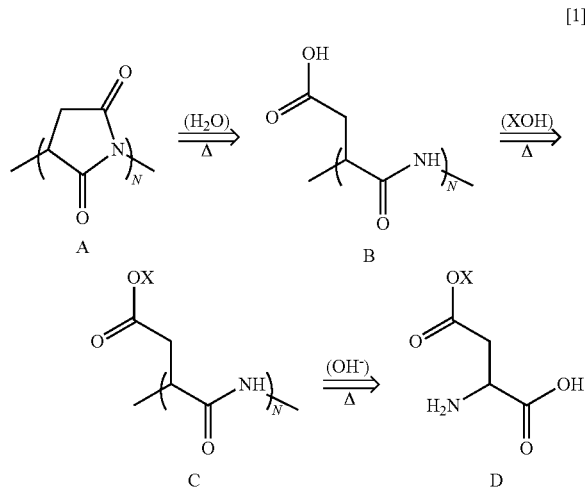

Figure 3:
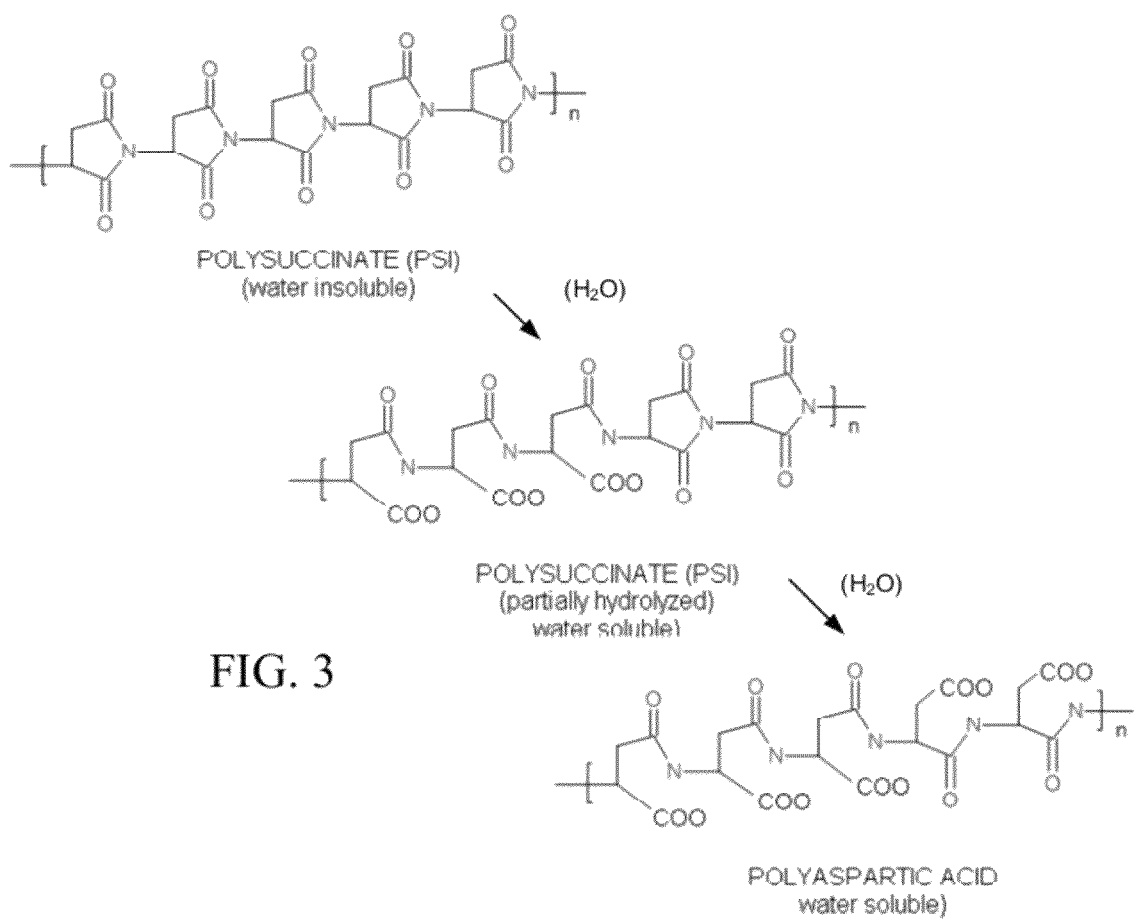
FIG. 3 illustrates the progression from an initial insoluble polyimide, polysuccinimide, to soluble products including, for example, partially hydrolyzed polysuccinimide and polyaspartic acid.
Figure 4:
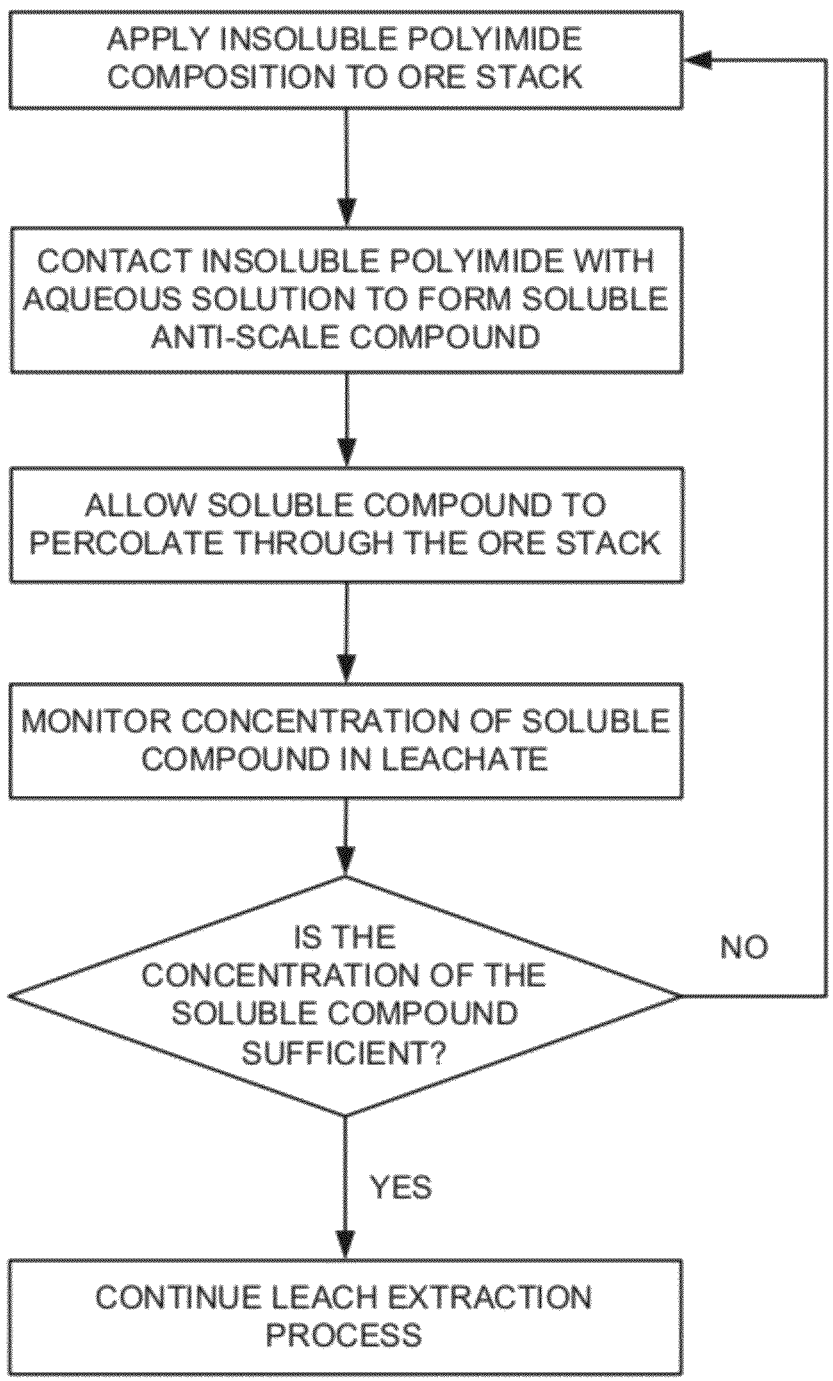
FIG. 4 illustrates an embodiment of a method according to the disclosure.

As shown above and in FIG. 3, the initial polysuccinimide (A) undergoes hydrolysis in the presence of water to form poly(aspartic acid) (B). The poly(aspartic acid) then undergoes base-catalyzed hydrolysis to form a polyaspartate derivative (C), which may undergo further degradation when, for example, it is exposed to high pH conditions, wherein hydrolysis of the imide linkages in the polymer backbone results in the formation of monomeric amino acids. In the case of X=H, the resulting amino acid will constitutes aspartic acid (D).

Although polysuccinimide is particularly well suited for treating subterranean formations in accordance with the present invention, other polyimides and copolymer derivatives may also be used alone or as a mixture with polysuccinimide and other different polyimides. Other polyimides may include polymaleimide, and a number of poly(amino acid) derivatives. Because polymaleimide is a polyolefin and not a poly(amino acid), however, it does not undergo the final step of hydrolysis to monomers through biodegradation, as does polysuccinimide.

Because of its suitability for use in the treatment of mineral heap leaching applications, reference throughout this description may be made specifically to polysuccinimide and its degradation products. It should be understood, however, that other polyimides and copolymers with units of polysuccinimide may be used as well. Therefore, unless it is apparent from its context, when polysuccinimide and copolymers or their degradation products are discussed, it may be alternatively read to include other polyimides and copolymers and their degradation products and mixtures thereof. Conversely, when polyimide or its degradation products are discussed, this may also be alternatively read to include polysuccinimide or its degradation or partial-degradation products and mixtures thereof.

The polysuccinimide may be a homopolymer or a copolymer that includes polysuccinimide and portions of aspartic acid or aspartate salts and other amino acid monomers. Copolymers may include partially-hydrolyzed polysuccinimide (with portions of polysuccinimide and polyaspartate or poly(aspartic acid) in the backbone). Copolymers may also include block or random copolymers with portions of at least two of the following monomer units: succinimide, maleimide, aspartate, aspartic acid, glutamic acid, asparagine, glutamine, lysine, arginine, alanine, valine, serine, threonine, and other amino acids and their salts thereof. Copolymers may also include aspartamide derivatives, formed from the reactions of amine compounds with individual carboxylate groups of the polycarboxylate such as polyaspartate or through ring-opening reactions of amines with succinimide groups. Examples of these reactions may include grafting hydrophilic poly(ethylene glycol) or poly(propylene glycol) oligomers or similar derivatives to the polyimide backbone from reactions with PEG-NH$_2$ (as reflected in, for example, the reactions described in W. Chen et al., *Colloids and Surfaces A: Physicochem. Eng'g Aspects* 278 (2006) 60-66.). This reference is hereby incorporated by reference, in its entirety.

Derivatization of the polysuccinimide polymers may also include hydrophobic modifications, such as formation of N-alkylaspartamides from the reactions of alkyl amines with polysuccinimide, such as the ring-opening reaction of dodecylamine with polysuccinimide to form N-dodecylaspartamides groups on the backbone (as disclosed, for example, in H. Chen et al., *Polymer* 46 (2005) 1821-1827). This reference is hereby incorporated by reference, in its entirety.

Although the molecular weight of the polyimide or polysuccinimide may vary, those having a molecular weight of from about 500 g/mol to about 10,000 g/mol, more particularly from about 1000 g/mol to about 5000 g/mol, and still more particularly from about 2000 g/mol to about 4500 g/mol are expected to be suitable for use in the disclosed method. An example of a commercially available polysuccinimide is one that is marketed under the brand BAYPURE® DSP, which is available from Lanxess Corporation of Orange, Tex. This polysuccinimide composition has an empirical formula of $[C_4H_3NO_2]_x$, is characterized by a molecular weight of from 2000 to 4000 g/mol and is further identified by its reference number CAS-No. 39444-67.

The polyimides or polysuccinimides may be used in treatment fluids for treating subterranean formations without the use of any phosphonates, such as inorganic phosphate, or fatty acids or derivatives of fatty acids. If such materials are present, they may be in insubstantial amounts that do not affect the performance of the polyimide.

The polyimide or polysuccinimide is preferably applied in a solid form. The polyimide may be in the form of particles of various sizes. The polyimide may also be formed into fibers, beads, films, ribbons, platelets, rods, elongated bodies or similar high-aspect-ratio shapes or other shapes. The polymers may be melt processed, mechanically-ground, cryo-ground, or blasted with abrasive particulates to provide the desired shape and size particle(s). The use of binders and other additives may also be employed to facilitate formation of the solid shapes and/or control the dissolution behavior of the resulting particles. If binders are used, they may be present in an amount of from about 0.5 to about 10% by total weight of the bound particle.

Various treatments of heap formations can be carried out using the polyimides or polysuccinimides in accordance with the invention. In particular, the polyimides may be used in conjunction with another scale inhibitor treatment, such as a polyacrylate treatment, but wherein the product of polyimide hydrolysis, which may include polyaspartate derivatives, may provide scale inhibition in addition to the conventional scale inhibitor treatment, and may include other non-scale inhibition effects, as are discussed herein, which may be beneficial.

Thus, in one particular application the polyimide or polysuccinimide-derivative particles are mixed into an ore along with lime in a gold heap leaching application.

The amount of polyimide or polysuccinimide used in a heap leach application may be from about 0.001% by weight or less of ore treated, with from about 0.01 to about 0.05% by weight being more typical. Application can be throughout the ore during crushing or as a surface application spread across the heap.

In its initial state, the polyimide or polysuccinimide is water-insoluble. Over time, the polymer hydrolyzes into more water-soluble polycarboxylic acid or poly(aspartic acid) derivatives, which then adhere to the matrix rock and other wetted surfaces and providing scale inhibition. This material also has the added benefit of long-term biodegradation, making it environmentally friendly.

Embodiments of the invention may further contain other additives and chemicals that are known to be commonly used in heap leach applications by those skilled in the art. These include, but are not necessarily limited to, materials such as surfactants, oxidizing agents, microorganisms, lime, cement and similar materials and compositions.

Polyaspartate will be produced as a result of the hydrolysis of the initial polysuccinimide material as the heap is exposed to water. Polyaspartate is known to be an effective calcium carbonate scale inhibitor, corrosion inhibitor, dispersant and is fluorescent which allows for its detection and measurement. Accordingly, the level of polyaspartate in the pregnant solution being removed from the heap leach can be monitored to ensure that sufficient Leach Column Test In this test an 8" (20 cm) diameter 5 ft (1.5 m) column of gold ore with a one inch (2.5 cm) crush size was leached using a recirculating sodium cyanide solution 0.2 g/L as NaCN. The leaching process was maintained for 41 days and then the gold and silver removed from the ore was extracted from the pregnant solution onto activated carbon. The amount of extracted gold and silver is expressed as a percentage of the theoretical extractable quantity based on an assay of the ore. The conventional combination of gold ore and lime were loaded into a first column and are present, in a second column the mixture of ore and lime was treated with a surface application of 200 g of polysuccinimide (BAYPURE® DSP). Over the course of the 41-day leach process, the polyimide slowly hydrolyzes to form polyaspartate that is, in turn, released into the leach solution and carried through the ore stack. The released polyaspartate provided scale control and improved percolation through the ore stack, the result being increased gold and silver extraction as reflected below in Table I.

TABLE 1

| Description | Crush Size, inches | Cumulative Recovery % Ag | Cumulative Recovery % Au | Consumption NaCN, lbs/st | Addition Ca(OH)$_2$, lbs/st |
| --- | --- | --- | --- | --- | --- |
| Control | ~1" | 3.8% | 85% | 0.83 | 3.00 |
| Polyimide | ~1" | 4.2% | 92% | 1.10 | 3.00 |

It can be seen that the polyimide surface addition increased gold and silver recovery. The increased extraction rate of 0.4% for silver and 7% for gold represent a significant improvement in the leach process that would be of great interest to mine operators, particularly in light of the increasing value of the precious metals and the relatively minor increase in the consumption of the cyanide salt.

Figure 1:
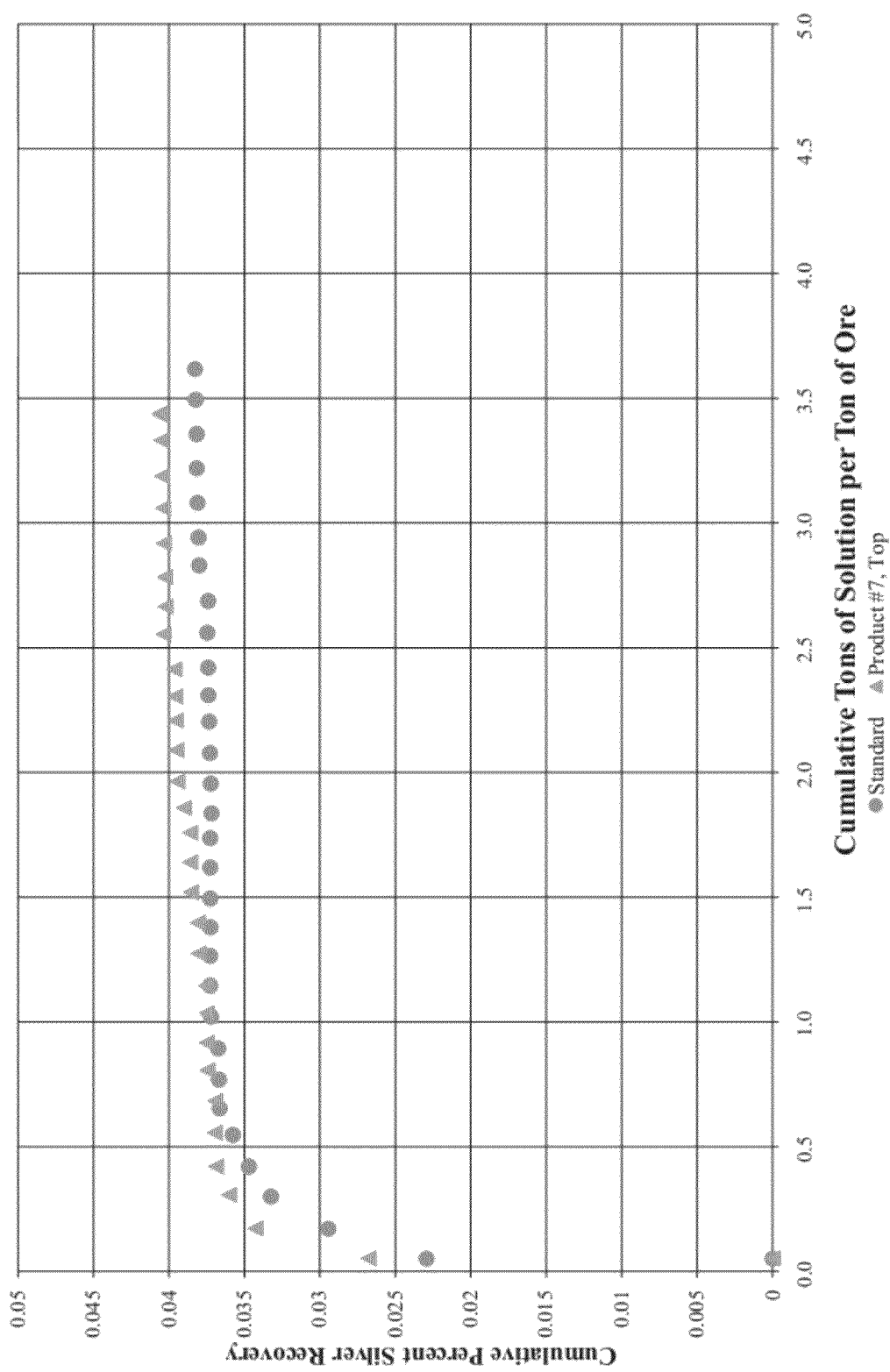
FIG. 1 is a chart representing the silver extraction performance of an embodiment of the disclosed method relative to conventional treatment.
Figure 2:
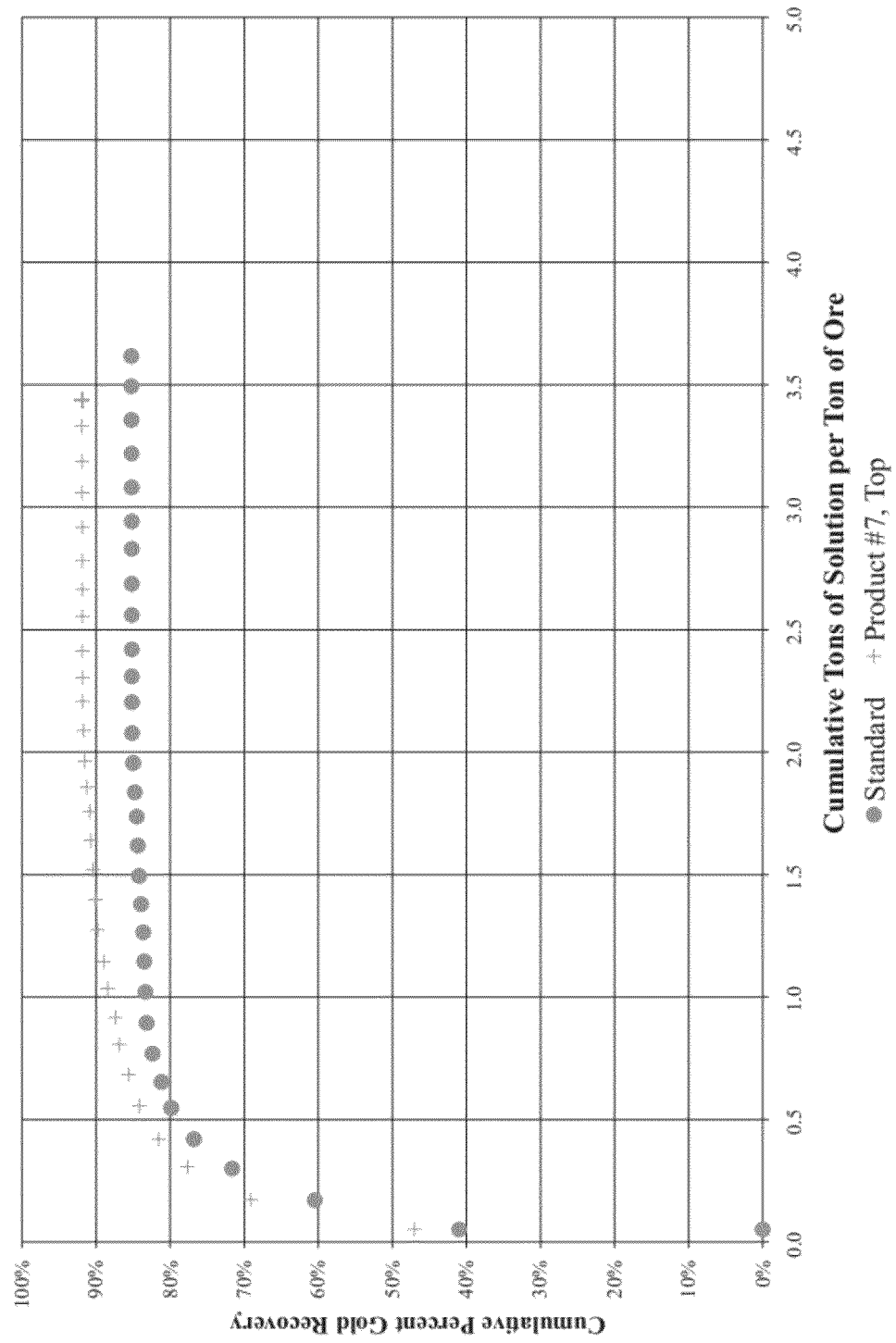
FIG. 2 is a chart representing the gold extraction performance of an embodiment of the disclosed method relative to conventional treatment.

As reflected in the charts presented in FIGS. 1 and 2, the cumulative silver and gold recovery over time in the column test showing that surface treatment with a polyimide was sufficient to increase both the initial rate of recovery and the cumulative total.

While the present invention has been described with references to preferred embodiments, various changes or substitutions may be made on these embodiments by those ordinarily skilled in the art without departing from the scope of the present invention. Therefore, the scope of the present invention encompasses not only those embodiments described above, but all those that fall within the scope of the claims provided below.

We claim:

1. A method of treating a heap leach formation, the method comprising:
    applying dry particles of an insoluble polyimide to an upper surface of an ore heap;
    applying a basic aqueous solution to the upper surface of the ore heap;
    inducing hydrolysis of the polyimide by contacting the insoluble polyimide with the basic aqueous solution, thereby releasing a hydrolysis product adjacent the polyimide; and
    permeating the ore heap with a mixture of the basic aqueous solution and the hydrolysis product.

2. The method of treating the heap leach formation according to claim 1, wherein:
    the water soluble product is selected from a group consisting of partially hydrolyzed polyimides, polycarboxylates, polycarboxylic acids and mixtures thereof.

3. The method of treating the heap leach formation according to claim 1, wherein:
    the polyimide is selected from a group consisting of homopolymers, copolymers and mixtures thereof.

4. The method of treating the heap leach formation according to claim 3, wherein:
    the polyimide is selected from a group consisting of polysuccinimide, polymaleimide, poly(aspartic acid), polyaspartate, poly(amino acids), poly(ethylene glycol), poly(propylene glycol), N-derivatized polyaspartamide and mixtures thereof.

5. The method of treating the heap leach formation according to claim 3, wherein:
    the polyimide comprises a copolymer, the copolymer selected from a group consisting of block copolymers, random copolymers and mixtures thereof.

6. The method of treating the heap leach formation according to claim 5, wherein:
    the copolymer comprises portions including at least two monomer units selected from a group consisting of succinimide, maleimide, aspartate, aspartic acid, glutamic acid, asparagine, glutamine, lysine, arginine, alanine, valine, serine, threonine, other amino acids, their salts and mixtures thereof.

7. The method of treating the heap leach formation according to claim 1, wherein:
    the insoluble polyimide is characterized by an average particle size of 1 to 10 cm.

8. The method of treating the heap leach formation according to claim 1, wherein:
    the insoluble polyimide is characterized by an average particle size of 1 to 10 mm.

9. The method of treating the heap leach formation according to claim 1, wherein:
the aqueous solution includes a cyanide salt and is characterized by a pH greater than 7.

10. The method of treating the heap leach formation according to claim 1, wherein:
the insoluble polyimide is applied to the upper surface of the ore heap using a broadcast spreader.

11. A method of treating a heap leach formation, the method comprising:
incorporating dry particles of an insoluble polyimide in an ore heap;
applying a basic aqueous solution to the ore heap;
inducing hydrolysis of the polyimide by contacting the particles of the insoluble polyimide with the basic aqueous solution, thereby releasing a hydrolysis product;
permeating the ore heap with a mixture of the basic aqueous solution and the hydrolysis product.

12. The method of treating the heap leach formation according to claim 11, further comprising:
collecting a leachate solution from the ore heap;
determining the concentration of the water soluble product in the leachate solution; and
applying particles of the insoluble polyimide to an upper surface of the ore heap if the concentration is below a target value.

13. The method of treating the heap leach formation according to claim 11, further comprising:
collecting a leachate solution from the ore heap;
determining the concentration of the water soluble product in the leachate solution;
introducing a supplemental volume of the water soluble product into a leachant solution if the concentration is below a target value to prepare a modified leachant solution; and
applying the modified leachant solution to an upper surface of the ore heap.

14. The method of treating the heap leach formation according to claim 11, further comprising:
collecting a leachate solution from the ore heap;
determining the concentration of the water soluble product in the leachate solution;
introducing a supplemental scale inhibitor into a leachant solution if the concentration is below a target value to prepare a modified leachant solution; and
applying the modified leachant solution to an upper surface of the ore heap.

15. The method of treating a heap leach formation according to claim 1, the method further comprising:
creating a localized acidic condition adjacent the polyimide.

16. The method of treating a heap leach formation according to claim 11, the method further comprising:
hydrolyzing a sufficient portion of the insoluble polyimide to reduce the size of the polyimide particles, thereby improving heap leach permeability.

17. The method of treating a heap leach formation according to claim 11, wherein:
the dry particles of the insoluble polyimide are incorporated in the ore heap at a loading rate of no more than about 0.05 wt %.

* * * * *